United States Patent [19]

Long

[11] Patent Number: 5,738,608
[45] Date of Patent: Apr. 14, 1998

[54] HYDRAULIC CONTROL FOR A MULTI-RATIO TRANSMISSION

[75] Inventor: Charles Francis Long, Pittsboro, Ind.

[73] Assignee: General Motors Corporation, Detroit, Mich.

[21] Appl. No.: 700,751

[22] Filed: Aug. 19, 1996

[51] Int. Cl.$^6$ ................................................ F16H 61/26
[52] U.S. Cl. ........................ 477/130; 477/156; 475/127
[58] Field of Search .......................... 475/127; 477/130, 477/154, 155, 156

[56] References Cited

U.S. PATENT DOCUMENTS

| | | | |
|---|---|---|---|
| 3,688,607 | 9/1972 | Marlow | 477/129 |
| 4,432,255 | 2/1984 | Borman et al. | 477/128 |
| 5,399,130 | 3/1995 | Long | 477/130 |
| 5,409,421 | 4/1995 | Sakai et al. | 477/156 X |
| 5,496,231 | 3/1996 | Eaton | 477/126 |
| 5,509,868 | 4/1996 | Eaton | 477/130 |
| 5,647,820 | 7/1997 | Matsumoto et al. | 477/155 |

*Primary Examiner*—Khoi Q. Ta
*Assistant Examiner*—Peter T. Kwon
*Attorney, Agent, or Firm*—Donald F. Scherer

[57] ABSTRACT

A power transmission control selectively establishes five forward speeds and one reverse speed by the controlling of three relay valves and two variable pressure TRIM valves. The TRIM valves normally control the pressure in the on-coming and off-going friction devices, respectively. The TRIM valves switch functions between ranges. In the fifth speed, the relay valves provide a pathway or passage for directing the fluid output of one of the TRIM valves to a control area on a system regulator valve to effect a variable main pressure.

2 Claims, 2 Drawing Sheets

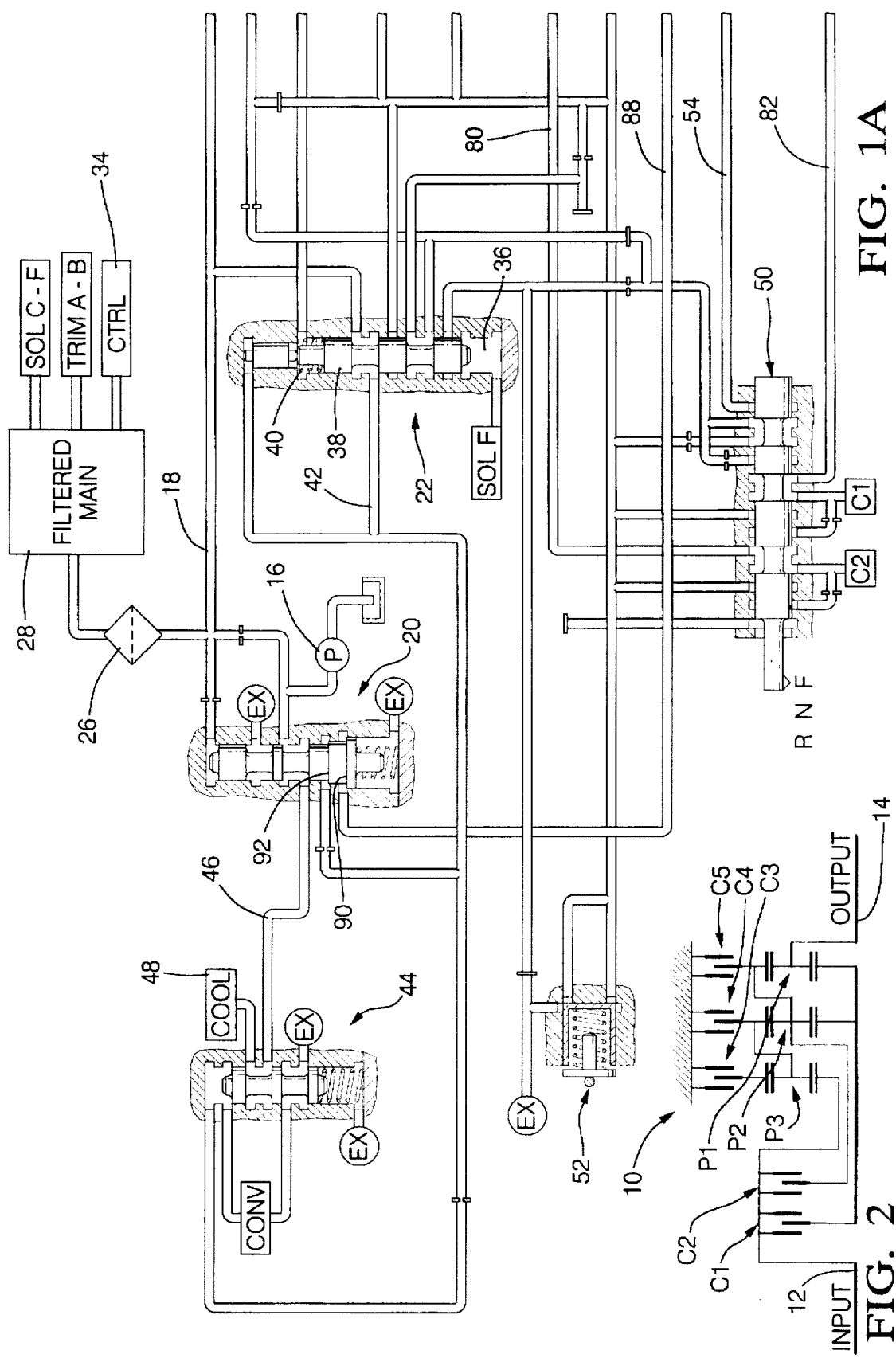

HYDRAULIC CONTROL FOR A MULTI-RATIO TRANSMISSION

TECHNICAL FIELD

This invention relates to hydraulic controls for power transmission.

BACKGROUND OF THE INVENTION

Power transmission controls have a main regulator valve which functions to establish the maximum system pressure under various operating conditions. In some applications, it is desirable to provide a variable pressure regulator to permit the reduction in main pressure during at least one operating range. For example, during the high forward speed range.

To accomplish this function, it has been necessary to utilize a dedicated valve to provide a variable bias pressure. In other applications, the control uses a single pressure source to reduce main pressure to a lower value. The use of a dedicate valve increases the cost and complexity of the hydraulic control mechanism and the use of a fixed pressure bias does not permit the transmission control to operate at the best efficiency point.

SUMMARY OF THE INVENTION

It is an object of this invention to provide an improved hydraulic control having a variable main pressure level during at least one operating range.

In one aspect of this invention, the hydraulic relay valves, when establishing the highest forward ratio, are positioned to direct the pressure output of one TRIM valve to a bias control area formed on the system pressure regulator valve. This permits the system pressure to be more closely controlled in line with the power requirements of the vehicle which must pass through the transmission.

With this improved control system, the overall maximum system pressure can be reduced, thereby improving efficiency, when the tractive effort demand of the vehicle is reduced. This will result in improved fuel economy and reduced loss for the vehicle.

BRIEF DESCRIPTION OF THE DRAWINGS

FIGS. 1A and 1B are diagrammatic representations of a hydraulic control system incorporating the present invention; and FIG. 2 is a schematic representation of a gear arrangement with which the hydraulic control of FIGS. 1A and 1B can be utilized.

DESCRIPTION OF AN EXEMPLARY EMBODIMENT

Figure 1B:
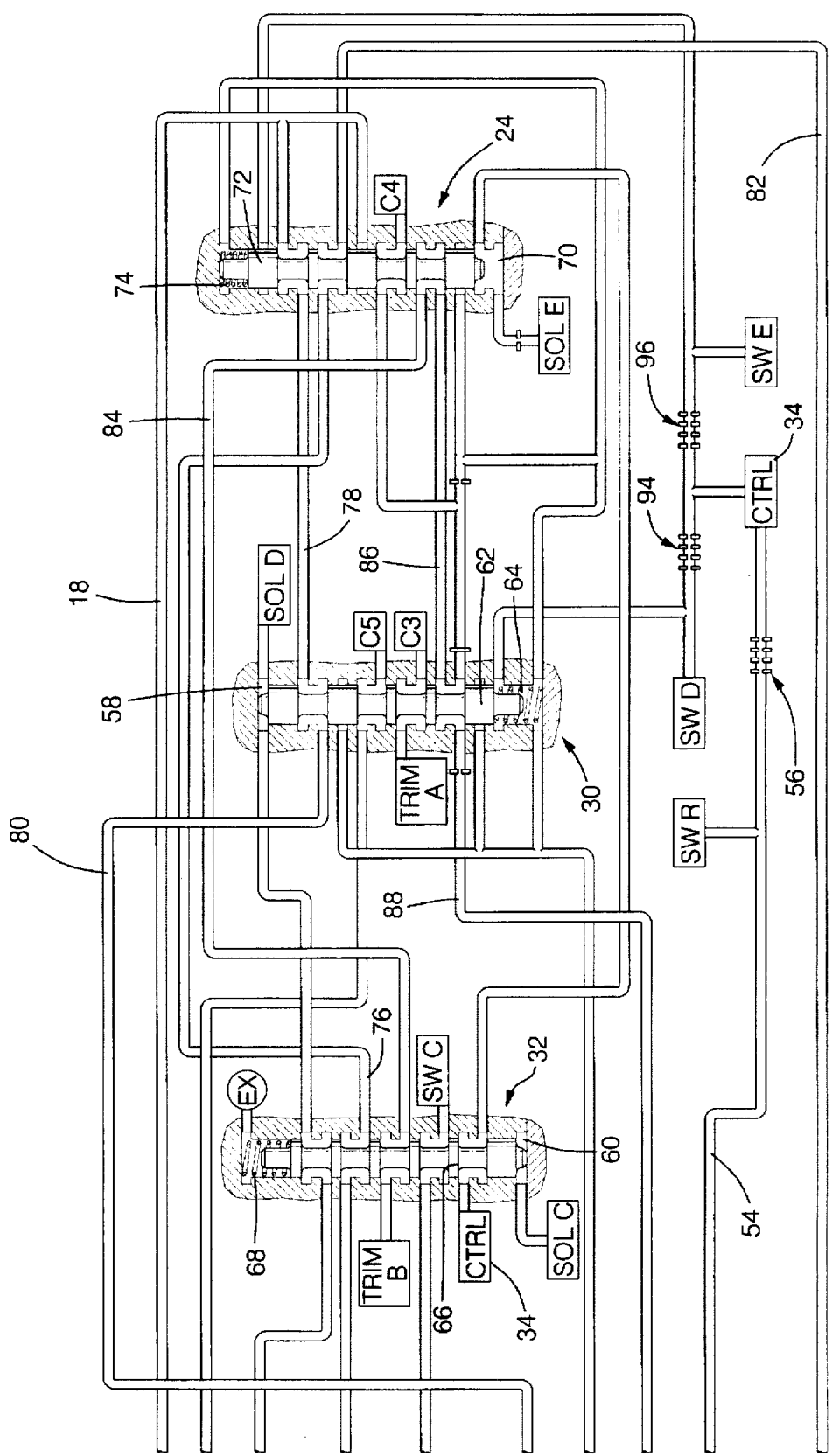

A power transmission 10, shown in FIG. 2, includes an input shaft 12, an output shaft 14, three planetary gear sets P1, P2 and P3, and five friction devices C1, C2, C3, C4 and C5. The manipulation, through engagement and disengagement, of the friction devices C1 through C5 in various pairs will permit the transmission to provide five forward speeds and one reverse speed between the input shaft 12 and the output shaft 14. The speeds are established in accordance with the teaching of U.S. Pat. No. 4,070,927 issued to Polak, Jan. 13, 1978, and assigned to the assignee of the present application.

The gearing arrangement disclosed in Polak is identical with that shown in FIG. 2 and is capable of providing six forward speeds and one reverse speed. However, under certain conditions and with certain vehicles, only five forward speeds are utilized. Therefore, the sixth forward speed is eliminated by programming the control function to not shift to the sixth forward speed. The five forward speeds are accomplished through the engagement of pair of friction devices.

The first and lowest speed ratio is provided through the engagement of friction devices C1 and C5. Second gear is provided through the engagement of friction devices C1 and C4. The third forward gear or speed range is provided through the engagement of friction devices C1 and C3. The fourth forward speed range is provided through the engagement of friction devices C1 and C2. The fifth forward speed range is provided through the actuation or engagement of devices C2 and C3. The reverse speed range is provided by the actuation of friction devices C3 and C5.

The friction devices C1 and C2 are conventional rotating multi-plate friction clutch means which are controlled through the actuation of a fluid operated piston by the introduction of fluid to an apply chamber in a well known manner. The friction devices C3, C4 and C5 are conventional multiple disc brake members which are also fluid operated through the selective application of fluid pressure to an apply piston in a well known manner.

Those skilled in the art and familiar with power transmissions will recognize the operation of these well known friction devices.

The friction devices C1 through C5 are hydraulically controlled through manipulation of the valving mechanism described in FIGS. 1A and 1B. The hydraulic control system in FIGS. 1A and 1B includes a positive displacement pump 16, which delivers fluid pressure to a main pressure passage 18. The fluid pressure in main passage 18 is distributed to a main regulator valve 20, a torque converter clutch valve 22, a relay valve 24, and through a filter 26 to a filtered main passage 28.

The pressure fluid in the filtered main passage 28 is delivered to a plurality of solenoid valves, solenoid C (SOL C), solenoid D (SOL D), solenoid E (SOL E) and solenoid F (SOL F). Solenoid E is provided for controlling the operation of relay valve 24, solenoid D is provided for controlling the operation of a relay valve 30, and solenoid C is provided for controlling the operation of a relay valve 32. The pressure fluid in filtered main passage 28 is also distributed to variable pressure valves, designated TRIM A and TRIM B. Valve TRIM A communicates with the relay valve 30 and valve TRIM B communicates with the relay valve 32. The filtered main pressure in passage 28 is further distributed to a control passage 34 which is connected with the relay valve 32 and also with a plurality of electrical switches including switch R (SW R), switch D (SW D), and switch E (SW E). A further electrical switch, switch C, communicates with the control pressure at relay valve 32 when the relay valve 32 is in the pressure set position as established by the solenoid C.

The torque converter clutch valve is operated or urged to an engaged position by solenoid F which supplies pressurized fluid to a control chamber 36. When the control chamber 36 is pressurized, a valve spool 38 is moved upwardly against a spring 40 to admit fluid pressure from the passage 18 to a clutch apply passage 42. The pressure in the clutch apply passage also provides a feedback pressure to the valve spool 38 thereby preventing or limiting the fluid pressure in passage 42. The pressure in passage 42 operates on a torque converter clutch relay valve 44, which is effective to reverse the flow of fluid through a conventional torque converter and clutch assembly, thereby causing engagement of the torque converter clutch.

When the torque converter clutch valve 22 is in the spring set position, that is, chamber 36 is exhausted, the main regulator valve provides an overflow or overage fluid to a torque converter passage 46 which is distributed by the torque converter relay valve 44 in a spring set position to the torque converter in normal flow fashion. The fluid in passage 46, after passing through the torque converter will pass through a cooler 48, when the torque converter is in operation, and when the torque converter clutch is engaged, the fluid in passage 46 is directed through the cooler 48 by torque converter clutch relay valve 44.

The hydraulic control system shown in FIGS. 1A and 1B further includes a manual selector valve 50 and an exhaust control valve 52. The exhaust control valve 52 is a conventional check valve which limits the minimum pressure within the exhaust passages of the hydraulic control. The manual selector valve 50 is movable to reverse "R", neutral "N" and forward "F" positions to establish the operation of the power transmission.

A similar control system is shown in U.S. Pat. Nos. 5,601,506, 5,643,125 and 5,616,093, all of which were filed on Oct. 13, 1995, in the name of Long et al. and assigned to the assignee of the present application. The description of the control system shown in the above applications, is similar to the operation of this control system.

The manual valve 50 is shown in the forward position, the relay valves 24, 30 and 32 are shown in the position for the fifth forward speed of operation, and the torque converter clutch valve 22 and torque converter clutch relay valve 44 are shown in the torque converter clutch engaged positions. In these conditions, the manual selector valve 50 closes a passage 54 from an exhaust connection, such that pressure in control passage 34 passing through a restriction 56 will energize switch R, thereby indicating that the manual selector valve is in the forward position of operation. The relay valves 32 and 30 are in the spring set position as controlled by the solenoids C and D, respectively.

In the spring set position, the solenoid D exhausts a control chamber 58 for the relay valve 30 and solenoid C exhausts a control chamber 60 for the relay valve 32. In these conditions, the spool 62 of relay valve 30 is urged to the spring set position by a spring 64, and the spool 66 of the relay valve 32 is urged to the spring set position by a spring 68.

The relay valve 24 is urged to the pressure set position by the application of fluid pressure from solenoid E to a control chamber 70. Pressure in the control chamber 70 urges the spool valve 72 against the spring 74 to thereby establish a pressure set position.

Each of the relay valves 24, 30 and 32 are manipulated between spring set and pressure set positions to establish the various drive ratios within the transmission. In the reverse drive ratio, that is, when the manual valve is moved to the "R" position, the solenoids D and E are energized thereby placing the relay valves 24 and 30 in the pressure set position and the valve 32 will be in the spring set position. In the neutral "N" condition of the manual selector valve, the solenoids C, D and E are all energized and therefore all of the relay valves will be in the pressure set position.

In the first range forward, the solenoid D is energized thereby placing the relay valve 30 in the pressure set position, while relay valves 24 and 32 are in the spring set positions. In the second forward range, all of the solenoids are de-energized thereby permitting all of the relay valves to assume their spring set position. In the third range forward, the solenoid C is energized thereby placing the relay valve 32 in the pressure set position, while relay valves 30 and 24 are in their spring set position. In the fourth forward speed range, solenoids C and E are energized to place the relay valves 24 and 32 in the pressure set position, while the relay valve 30 is in the spring set position. As previously noted in the fifth range, solenoid E is energized such that relay valve 24 is disposed in the pressure set position, while relay valves 30 and 32 are in the spring set position.

When shifting from neutral to first, the control system will admit main line pressure through relay valve 24 and the manual valve 50 to the friction device C1, thereby energizing that device. An electronic control system or microprocessor, not shown, will control the operation of the various solenoids and variable pressure TRIM valves utilized in the control system.

In the first range of operation, the variable pressure valve TRIM A will distribute controlled fluid pressure to the friction device C5, thereby completing engagement of that device and the establishment of the first forward speed range. When moving from first to second speed, the variable pressure valve TRIM B distributes fluid pressure via relay valves 32 and 24 to friction device C4 to control the engagement of that device, while the valve TRIM A is causing a reduction or controlling a reduction of the pressure in C5. When C5 is exhausted and C4 is energized, the second range of operation will occur.

It should be noted now that TRIM B is providing pressure, while TRIM A is idle (i.e., has no ratio control function). However, on a ratio change from second to third, TRIM A will be utilized to pressurize friction device C3, while TRIM B is depressurizing device C4. Also, with the valves in the position designated for the third range, a passage 76 connected between relay valve 32 and relay valve 24 is connected with the variable pressure valve TRIM B. When the relay valve 24 is in the spring set position, the passage 76 connects with a passage 78 through relay valve 24. The passage 78 is connected with a passage 80 through the relay valve 30 and the passage 80 is connected through the manual valve 50 to the friction device C2.

The friction device C1 is controlled in engagement by the fluid in main passage 18. However, when the solenoid valves are energized to establish the fourth range, the pressure connections between friction devices C1 and C2 will be interchanged by the relay valve 24. After the fourth range is fully established, the relay valve 24 will distribute main pressure in passage 18 to passage 78, which in turn, is connected as described above to the friction device C2. Fluid pressure to friction device C1 is distributed by variable pressure valve TRIM B via passage 76 to relay valve 24 in passage 82 to the manual valve 50 and friction device C1.

It should be noted that in the fourth range of operation, the solenoid valve E has been energized, thereby pressurizing chamber 70 and valve 32 is in the pressure set position also. Under these conditions, the variable pressure and output of TRIM A is connectible with friction device C3 and the variable pressure TRIM B is connected with the friction device C1.

To provide a 4–5 interchange, the pressure in TRIM B is decreased while the pressure at TRIM A is increased, thereby causing a swap between the friction devices C1 and C3. When C3 is fully engaged and C1 disengaged, the devices C2 and C3 will control the transmission in the fifth range of operation. When the fifth range has been established, the solenoid C is de-energized, thereby exhausting chamber 60, such that the spring set position of relay valve 32 is achieved and TRIM B has no ratio control function.

Under these conditions, with the present invention, the output pressure of TRIM B is distributed through a passage 84 to the relay valve 24 and then, by spool 72 to a passage 86 which is connected with relay valve 30 and then via spool 62 to a passage 88 which is connected to a control chamber 90 formed as a differential area on the main regulator valve 20. It should be noted that when the 4–5 ratio interchange is completed, the pressure output of TRIM B is zero.

The fluid pressure output of TRIM B can then be adjusted upward as road load or other torque requirements are reduced, thereby increasing the fluid pressure on the control chamber 90 which will effect a reduction in the output pressure in main passage 18. With a reduction of pressure in passage 18, a reduced power input requirement is necessary at the pump "P", thereby increasing the overall efficiency of the system. Also, since the excess fluid pressure in passage 18 will be dumped to exhaust at a lesser differential pressure, there is less heat generated in the transmission.

The main regulator 20 also has a differential area chamber 92 which is connected with the passage 42. The fluid pressure in this chamber 92 causes the main regulator 20 to reduce the pressure in passage 18 by a fixed value whenever the torque converter clutch is engaged. When the torque converter clutch is engaged, the torque converter will no longer multiply the engine torque, therefore input torque to the transmission is limited to the output torque of the engine. Thus, the torque capacity requirement of the friction devices is limited.

It should be noted that the control pressure 34 passes through a restriction 94 to switch D and relay valve 30, and through a restriction 96 to switch E and the relay valve 24. In the pressure set position shown of valve 24, the passage exhausting switch E is blocked, thereby providing a pressure at switch E which will inform the processor that the relay valve 24 is in the pressure set position. At this time, the switch D is exhausted through the relay valve 30 and the switch C is exhausted through the relay valve 32. This will inform the microprocessor that the only relay valve actuated or pressure set is valve 24. This occurs only in the fifth range of operation. Therefore, the processor at this time can provide the appropriate electrical signals to the variable pressure valve controlling the pressure at TRIM B to provide the necessary bias pressure at the main regulator 20.

In one transmission control proposed for use with the present invention, the main regulator valve 20 will control the maximum system pressure at 230 psi whenever torque converter operation is provided. When the torque converter clutch is engaged and the transmission is operating in a range less than the fifth range, the system pressure in passage 18 is reduced to 150 psi by establishing the control pressure in the chamber 92. When the fifth range is achieved, the control pressure in passage 88 operating in the control chamber 90 can be varied from zero to the maximum value. Obviously, the maximum value obtainable in chamber 90 with the present arrangement is when the pressure at TRIM B equals the pressure in main line 18. By providing the appropriate differential area in chamber 90, the pressure at TRIM B can be increased from zero to 78 psi, while the pressure in main passage 18 will decrease from 150 psi to 78.

It is also possible to utilize the pressure reduction of main passage 18 during fifth range torque converter operation. However, it is not likely that a reduction in passage 18 would be desired whenever torque converter operation is in effect, since the input torque to the transmission would be significantly higher than engine, suggesting that the vehicle torque requirements are sufficiently high so that a reduction in system pressure is not desired.

It should be obvious from the foregoing description that the controlled reduction of pressure in main passage 18 will provide for increased efficiency and reduced heat rejection within the transmission, thereby providing increased overall vehicle efficiency.

I claim:

1. A hydraulic control for a multi ratio transmission comprising:

hydraulic pump means a variable pressure regulator valve in fluid communication with said pump means for establishing a main pressure fluid in the hydraulic control including a control bias area;

first, second and third relay valve means;

first and second variable pressure TRIM control valves;

a plurality of selectively engageable friction torque transmitting mechanisms disposed to receive main pressure fluid for engagement thereof to selectively establish a plurality of forward speed ratios and a reverse speed ratio;

fluid passage means interconnecting members of said control comprising said pump means, said variable pressure regulator valve, said relay valve means, said TRIM control valves and said friction torque transmitting mechanisms for distributing hydraulic fluid thereto as directed by the interconnected members;

said first, second and third relay valve means having a pressure set position and a spring set position, said first and second relay valve means being spring set to establish one forward speed ratio, said third relay valve means being pressure set during said one forward ratio to receive a variable pressure from said second TRIM control valve via said first relay valve means and to deliver said variable pressure to said control bias area via said second relay valve means to affect controlling of the main pressure fluid during the one forward ratio.

2. A hydraulic control for a multi ratio transmission comprising:

hydraulic pump means a variable pressure regulator valve in fluid communication with said pump means for establishing a main pressure fluid in the hydraulic control including a control bias area;

first, second and third relay valve means;

first and second variable pressure TRIM control valves;

a plurality of selectively engageable friction torque transmitting mechanisms disposed to receive main pressure fluid for engagement thereof to selectively establish a plurality of forward speed ratios and a reverse speed ratio, at least three of said friction torque transmitting mechanisms being controlled for engagement and disengagement by hydraulic fluid from said first and second variable pressure TRIM control valves as directed by said relay valve means;

fluid passage means interconnecting members of said control comprising said pump means, said variable pressure regulator valve, said relay valve means, said TRIM control valves and said friction torque transmitting mechanisms for distributing hydraulic fluid thereto as directed by the interconnected members;

said first, second and third relay valve means each having a pressure set position and a spring set position, said first and second relay valve means being spring set to establish one forward speed ratio, said third relay valve means being pressure set during said one forward ratio to receive a variable pressure from said second TRIM control valve via said first relay valve means and to deliver said variable pressure to said control bias area via said second relay valve means to affect controlling of the main pressure fluid during the one forward ratio.

* * * * *